(12) United States Patent
Wong et al.

(10) Patent No.: US 8,321,889 B2
(45) Date of Patent: Nov. 27, 2012

(54) METHOD AND SYSTEM FOR PERSONALIZED AND LOCALIZED TV AD DELIVERY

(76) Inventors: Kamfu Wong, Hong Kong (CN); Ninghua Pu, Hong Kong (CN)

(*) Notice: Subject to any disclaimer, the term of this patent is extended or adjusted under 35 U.S.C. 154(b) by 1308 days.

(21) Appl. No.: 10/585,225

(22) PCT Filed: Mar. 8, 2006

(86) PCT No.: PCT/CN2006/000351
§ 371 (c)(1),
(2), (4) Date: Jun. 30, 2006

(87) PCT Pub. No.: WO2007/101368
PCT Pub. Date: Sep. 13, 2007

(65) Prior Publication Data
US 2009/0228914 A1    Sep. 10, 2009

(51) Int. Cl.
*H04N 7/10* (2006.01)
(52) U.S. Cl. ............................................... 725/35
(58) Field of Classification Search .......... 725/9, 34–46, 725/152, 32
See application file for complete search history.

(56) References Cited

U.S. PATENT DOCUMENTS

| | | | |
|---|---|---|---|
| 6,698,020 B1* | 2/2004 | Zigmond et al. | 725/34 |
| 7,243,362 B2* | 7/2007 | Swix et al. | 725/34 |
| 2002/0010626 A1* | 1/2002 | Agmoni | 705/14 |
| 2002/0016972 A1* | 2/2002 | Ogawa et al. | 725/133 |
| 2002/0078441 A1* | 6/2002 | Drake et al. | 725/9 |
| 2002/0083444 A1* | 6/2002 | Blasko et al. | 725/35 |
| 2002/0087980 A1* | 7/2002 | Eldering et al. | 725/35 |
| 2002/0100042 A1* | 7/2002 | Khoo et al. | 725/34 |
| 2002/0120498 A1* | 8/2002 | Gordon et al. | 705/14 |
| 2002/0124253 A1* | 9/2002 | Eyer et al. | 725/34 |
| 2003/0154475 A1* | 8/2003 | Rodriguez et al. | 725/32 |
| 2003/0229893 A1* | 12/2003 | Sgaraglino | 725/37 |
| 2005/0188402 A1* | 8/2005 | de Andrade et al. | 725/46 |
| 2006/0195866 A1* | 8/2006 | Thukral | 725/34 |

* cited by examiner

Primary Examiner — Vivek Srivastava
Assistant Examiner — Aklil Tesfaye
(74) Attorney, Agent, or Firm — Keusey & Associates, P.C.

(57) ABSTRACT

A personalized and localized TV Ad delivery method and system comprise of Ad Center (1), Intelligent Control Module (2), and Display (3) and/or TV (4). Ad Center (1) collects and processes information for ads, ad agencies, advertisers, and TV users. TV user information includes subscriber information associated with a user and public and/or purchasable user information like demographic data, user age group, family group, profession, credit history, etc. Intelligent Control Module (2) interfaces with Ad Center (2) and Display (3) and/or TV (4), collects user viewing program content preference, user ad preference, and user viewing patterns, which, at the discretion of users and based on local rules and regulations, can be uploaded to Ad Center (1). Intelligent Control Module (2) and/or Ad Center (1) also utilize artificial intelligence, mathematical, and statistical techniques for decision processing to produces a user personalized and localized ad schedule and/or ad set pertaining to channels and time, which governs the appropriate ad display during commercial times for certain or all channels. Application of the present invention enables ad agencies and/or advertisers directly and accurately personalize and localize their advertisements to potential buyers and/or locations that might have the interests or needs for the advertised products or services, and greatly enhance the effectiveness of TV advertisements.

20 Claims, 3 Drawing Sheets

METHOD AND SYSTEM FOR PERSONALIZED AND LOCALIZED TV AD DELIVERY

TECHNICAL FIELD

The present invention relates to telecommunication, computer, TV advertisement, and TV broadcast operations.

BACKGROUND OF THE INVENTION

Advertisement (Ad) is one way of information communication, which plays an important role in every country's economy. Advertisers generally are ad agencies, product manufacturers, retailers, or service providers. The purpose of an advertisement is to promote a brand, product, service, with the goal to expand business and increase customer base. In addition to ad billboard, ads currently are distributed through a variety of channels, like radio, cell phones, internet, and TV, including satellite TV, cable TV, terrestrial TV, internet TV or Internet Protocol (IP) TV. Since ads shown through TV carry both audio and video information, they are vivid and colorful and are likely to leave deeper impressions to users than other channels. However, some problems with TV ads are:

It can be expensive, like during certain sports events (e.g. super bowl), during prime time, or with major TV networks;

It is not personalized for individual users, for example, ads for construction materials will mostly appeal to construction workers or people interested in home improvement, ads on consumer goods are attractive to people interested in the related categories, ads on tires are of interest to people planning to change their tires; in other words, a large portion of the people watching TV ads are not interested in the advertised products or services, at any given time, only a limited portion of people among all the TV viewer might be interested in the displayed ads;

It is not localized for individual users, for example, people interested in certain street blocks might be interested in learning the specials going on at their local stores, people in country clubs might be interested in wines, people in sports might be interested in beers, etc, however, our current TV ads can only be localized for metropolitan areas.

There are problems with our current TV advertising since it targets blindly to mass users and cannot be personalized and localized for individual users. It has resulted in a lot of wasted resources, wasted people's time, wrong flow of information, etc. A TV ad delivery method and system that can personalize and localize ads to individual users are valuable and important for effectiveness of TV ads delivery, TV users and advertisers.

SUMMARY OF THE INVENTION

The purpose of the present invention is to provide a method and system for personalized and localized TV ad delivery, which delivers ads based on individual user's interest, needs, ad preferences, and location properties. Implementation of the present invention will greatly enhance the effectiveness of TV advertising and improve information exchange between advertisers and users.

The purpose of the present invention is realized through a system for personalized and localized TV ad delivery, comprising:

Ad Center (1),
Intelligent Control Module (2), and
Display (3) and/or TV (4);

Ad Center (1) interfaces with Intelligent Control Module (2); Intelligent Control Module (2) interfaces with Display (3) and/or TV (4). Delivery of TV ads and/or program content through Display (3) and/or TV (4) is via Intelligent Control Module (2);

Ad Center (1) collects and processes information for ads, ad agencies, advertisers, and TV users and sends the information, based on an ad and user's personal and local attributes, to the matched Intelligent Control Modules (2), which then deliver personalized and localized ads on Display (3) or TV (4) during TV commercial times;

Intelligent Control Module (2) is capable of multi-directional communication with Ad Center (1) and/or TV Service providers, has multiple connectors, through which users can follow-up and search for ad information.

Additionally, the present invention is realized through a method for personalized and localized TV ad delivery, including processes for setting up the said system.

The main approach for the present invention for the said method and system is through setting up of a TV Ad System. The system constantly analyzes individual user's needs for potential products or services she or he might be interested through the user owned or leased intelligent control module (2) by collecting and processing user attributes, ad attributes, and/or user viewing patterns, and/or user ad preference setup, and/or local laws and regulations. These data are analyzed by intelligent programs residing in the ad decision support unit (2-1), which generates a user personalized and localized ad schedule, pertaining to channels and time. Intelligent programs utilized by the present invention are artificial intelligent (AI) based technologies like rules engine, mathematical and statistical derivations like those used by data mining and business intelligence applications. Since ads processed and displayed by the present invention are personalized and localized to individual user's needs and preferences, it dramatically improves the effectiveness of TV ads impacts to users.

User attributes collected by they said intelligent control module (2) include user's age group, profession, location properties, account and service information, program preference, and/or TV viewing patterns and ad preferences, and/or public or purchasable user information like demographic data, user credit history, household information, and/or merchant types, category and attributes. Ad attributes include the common ad properties like ad agency or advertiser info, ad effective period, target channel, target time, etc; it also includes the dynamic ad information supported by the present invention like targeted user attributes, follow-up ad information, related video and advertiser data information.

Benefit of the said method and system in accordance with the present invention is the improved effectiveness of ad delivery and presentment to users with a high potential of liking and acting on the ad. On the other side, it also motivates ad agencies and advertisers to use TV more for personalized and localized ad delivery. On the users side, because TV ad will be personalized and localized towards their needs, users will watch TV ads more and thus improving the ad watch rating; on the ad agency or advertiser end, they might find their advertised products sell more, which in turn would generate more demand for implementation of the present invention. All parties involved in this cycle can be benefited.

DETAILED DESCRIPTION OF THE PREFERRED EMBODIMENT

The following details the said method and system in accordance with the present invention with references to drawings, with the same numbers indicating and cross referencing the same units.

Figure 1:
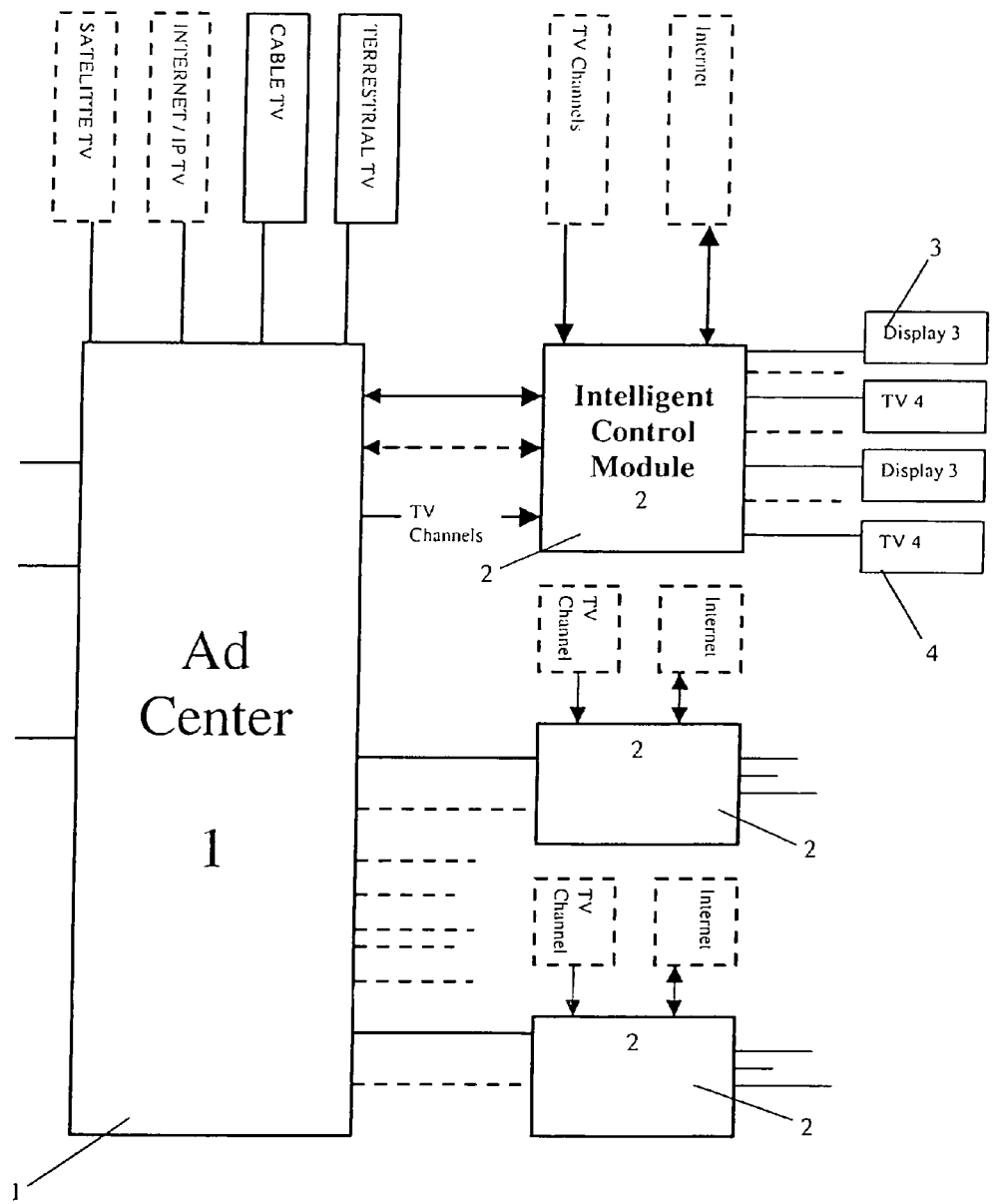
FIG. 1 illustrates a block diagram of a method and system for personalized and localized Ad delivery in accordance with the present invention.

FIG. 1 is a block diagram of a method and system for personalized and localized ad delivery in accordance with the present invention, depicting the said method and system comprises Ad Center (1), Intelligent Control Module (2), and Display (3) and/or TV (4), wherein display (3) also includes computers. The said Ad Center (1) can be Terrestrial TV Service Providers, and/or Cable TV Providers, and/or Satellite TV providers, and/or Internet TV service providers, and/or Internet Protocol (IP) TV Service providers, and/or independent content service providers; or it can be affiliated with these TV and/or content service providers; or it can be an independent personalized and localized Ad service provider with interfaces to these TV and/or content service providers. Ad Center (1) is a big computer and telecommunication system, utilizing computer for information processing and control, telecommunication components and networks for TV channels, program content, video, audio, and data ad information transmission, and interface components for data communication; it broadcasts similar or different personalized and localized ads to different TV users. When the ad center (1) itself is a TV service provider, it can broadcast TV program and channels as well as TV ads.

Ad Center (1) in FIG. 1 is depicted as affiliated to TV service providers or an autonomous entity. It can take program content from satellite TV, terrestrial TV, cable TV, and internet/IP TV. Ad information by ad agencies or advertisers can also be provided through internet to the Ad center (1), which, through its interfaces with internet and to the intelligent control module (2), supports user activities like ad follow-up and ad search.

Ad center (1) acts as a server with telecommunication and network interfaces with its clients: intelligent control modules (2), which are usually inside TV users' location like houses, shops, restaurants, bars, plants, factories, etc. The said intelligent control modules (2) has multiple interfaces and can communicate with broadcasting centers and/or ad center (1) multi-directionally, which is unlike the unidirectional TV set-top boxes currently used by a large portion of the TV users.

Intelligent control module (2) interfaces with the internet with its input/output ports, which include Ethernet port and/or wireless adapter capable of broadband connections. User can use these ports to search for additional ad information, including connecting with ad center (1) for ad follow-up.

As depicted in FIG. 1, an intelligent control module (2) can be connected to one display (3) and/or TV (4), or multiple displays (3) and/or TVs (4). When TV service provider and ad center (1) is the same system, TV channels and programs are transmitted from the ad center (1) directly to the intelligent control module (2). If TV service provider and ad center (1) are two different systems, TV channels and programs can be transmitted through different connectors on the intelligent control module (2), and/or TV channels and programs can be transmitted through the regular TV set-top boxes, with intelligent control module (2) embedded inside the set-top boxes. Intelligent control module (2) intercepts and interacts with TV program content and ad content for personalized and localized TV ad delivery.

If TV channels and programs are delivered through internet like IPTV, an intelligent control module (2) can be either inside or outside a computer, with connections to display (3) for personalized and localized ad broadcasting.

Figure 2:
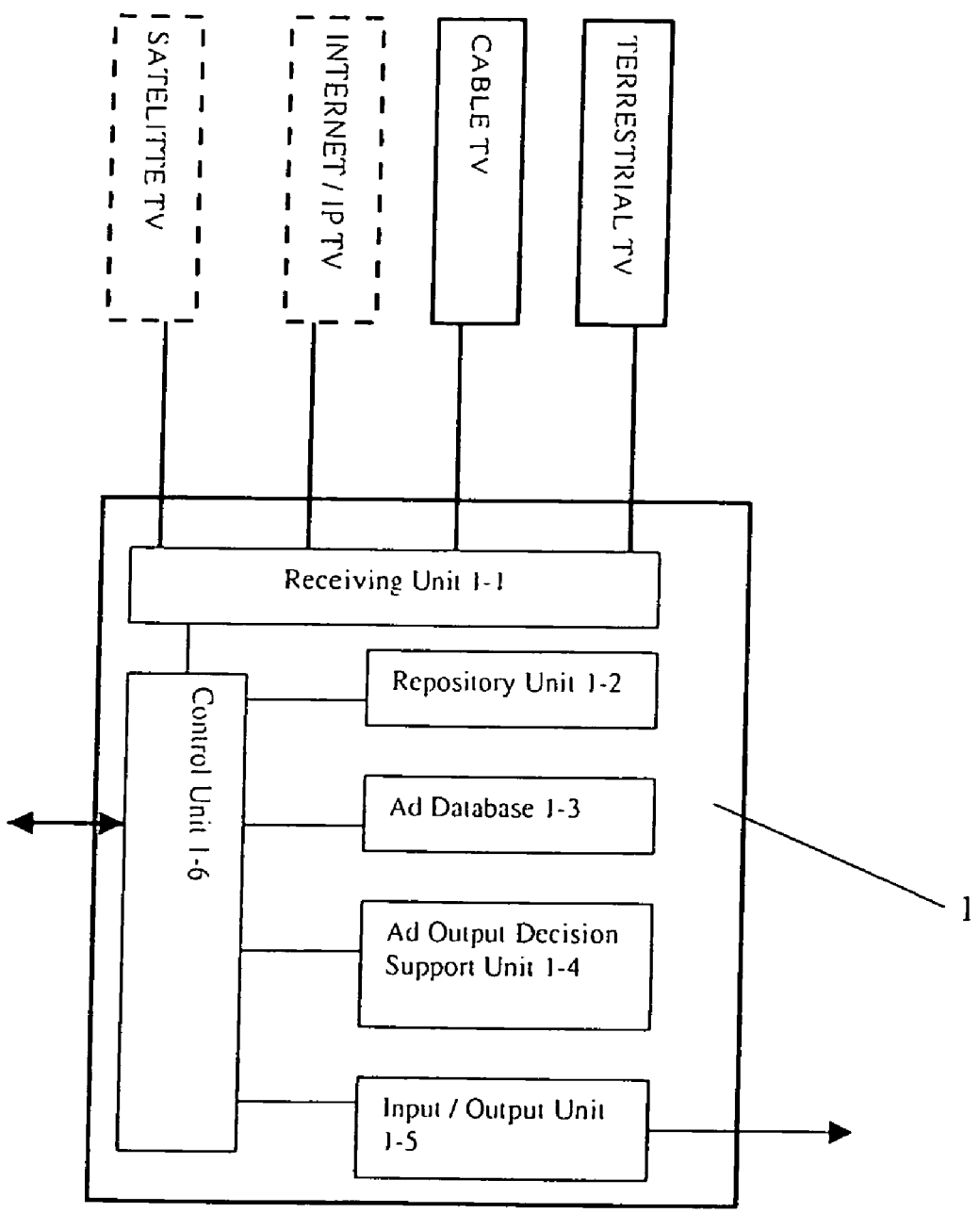
FIG. 2 illustrates the main components of the Ad Center (1) in accordance with the present invention.

FIG. 2 illustrates the main parts of the Ad Center (1) in accordance with the present invention. The said ad center (1) comprises:

Receiving Unit (1-1): receives TV channels and programs and/or ad content from satellite TV providers, and/or cable TV Providers, and/or TV stations, and/or terrestrial TV providers, and/or Internet TV providers, and/or IPTV;

Repository Unit (1-2): stores advertiser or ad agency information, ad information, and user information. User information includes intelligent control module (2)'s access card information, localization information, user attributes, and/or user viewing patterns and ad preferences collected by intelligent control modules (2);

Ad Database (1-3): stores all the ads and/or expired ad information. In addition, it contains related ad follow-up information that provides additional and more detailed video or data information for the applicable ads;

Ad Output Decision Making Unit (1-4): performs data processing and decision making based on ad attributes and user attributes that are associated with each intelligent control module (2). It decides the appropriate ad set that might be applicable for each intelligent control module (2); and/or, with each intelligent control module's viewing patterns and ad preferences, decides user personalized and localized ad schedule;

Input/Output Unit (1-5): handles communication with Intelligent Control Module (2), and/or external sources, including distribution of ad sets, and/or ad schedules to Intelligent Control Module (2) upon generation of user directed ad sets and/or user personalized and localized ad schedules by Ad Output Decision Making Unit (1-4), user information from the Repository Unit (1-2) to Intelligent Control Module (2), receipt of user requests, and/or transmission of upload information on user viewing patterns and/or ad preferences from Intelligent Control Module (2), etc;

Ad Control Unit (1-6): controls and monitors all units, components, and their operations inside the Ad Center (1), in addition, processes and dispatches information and requests and controls software updates for Intelligent Control Module (2).

Ad output decision support unit (1-4) personalizes and localizes ad based on ad and user attributes for determination of user applicable ad set. Localization categorization can be based on zip code, zip plus 4, telephone area code, census tract data, building district information, road sector, etc. With a more granular classification of localized information, smaller merchant can also buy ads for localized ad directing to users within a building district and other location attributes. Personalization processing can be based on user and ad attributes. User attributes include includes user's age group, profession, location properties, account and service information, program preference, and/or viewing patterns and ad preferences, and public and purchasable user information like demographic data, user credit history, and household information; if user's a merchant, user information also includes merchant type, category and attributes. According to related country or area's law and regulations, user TV viewing patterns and user ad preference setup in user attributes can be, at the discretion of user, uploaded and stored in the ad center (1).

Ad attributes include the common ad properties like advertiser info, ad effective period, target channel, target time, etc., it also includes the dynamic ad information supported by the present invention like targeted user attributes, follow-up ad information, related video and advertiser data information. Execution of the Ad output decision support unit (1-4) is event-triggered. Addition, change, and removal of data can also trigger the execution of the output decision support unit (1-4) for generation, in real-time, the user applicable ad sets.

Ad output decision support unit (1-4) determines the ad set to be transmitted to the intelligent control module (2).

Ad attributes are processed by the ad output decision support unit (1-4) with different weight values, including:
 a. Ad personalization attributes,
 b. Ad localization attributes,
 c. Ad start and end date,
 d. Targeted channel information,
 e. Other attributes.

Ad personalization and localization attributes include:
 a. Ad category and directed user attributes,
 b. Ad content keywords and/or searchable meta data,
 c. Ad follow-up information,
 d. Related video, data and merchant info,
 e. Other attributes.

User attributes can also be collected through the user subscriber information (account information) and further derived. With the method and system in accordance with the present invention, user attributes also can be input or collected by the intelligent control module (2) to be uploaded to the ad center (1) for storage and analysis for further information processing.

User TV viewing patterns and user ad preferences are collected through the intelligent control module (2). According to related country and area's laws and regulations, these data can be uploaded to the ad center (1) upon approval from users for information processing to determine the appropriate personalized and localized ad schedule. TV viewing patterns include frequently watched channels and programs, their categories and attributes, viewing times, etc. Users can also setup their preferred or unwanted ads or ad types.

Upon generation of the ad set directed to a user by the Ad Output Decision Support Unit (1-4), the ad set is transmitted to the intelligent control module (2) through the input/output unit (1-5), for presentation by the display (3) and/or TV to users for watching during TV commercial times.

Ad center (1) communicates with intelligent control module (2) through this addressable access card, which has an address code for identification and control. Additionally, communication between the ad center (1) and intelligent control module is bi-directional.

Ad center (1) periodically sends ads and/or TV program contents, through the event-driven mechanism, to the intelligent control module (2) for storage, update, and display.

Figure 3:
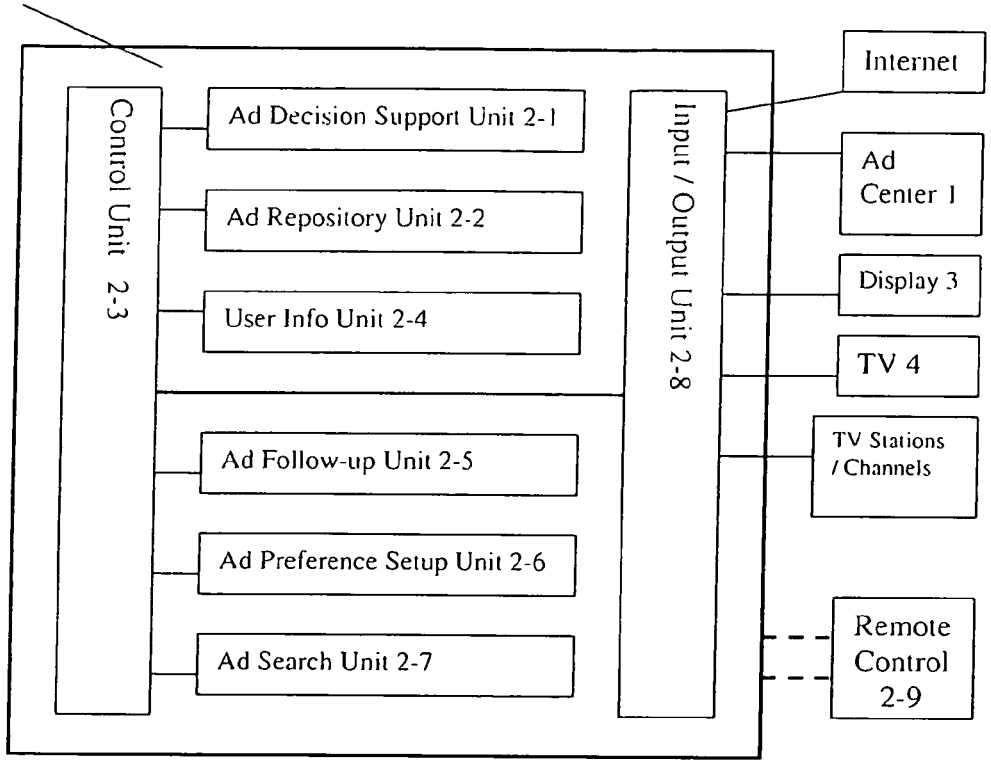
FIG. 3 illustrates the main components of the Intelligent Control Module (2) in accordance with the present invention.

FIG. 3 illustrates the main components of the Intelligent Control Module (2) in accordance with the present invention, comprising:

Ad Decision Support Unit (2-1): determines user personalized and localized ad schedules pertaining to channels and time, and collects user viewing patterns, which is based on intelligent programs (Artificial Intelligent (AI) based rules engine and business rules, mathematical and statistic derivations) and event-driven triggering mechanism; expert business rules and mathematical and statistic models are established on user and ad attributes information, including viewing patterns and user ad preferences;

Ad Repository Unit (2-2): stores personalizable and localizable ads and/or all other normal ads (ads without personalizable and localizable attributes), which are updated in real-time by Ad Center (1), and removed in real-time based on their expiration attributes;

Control Unit (2-3): controls and monitors all units, components, and operations within the intelligent control module (2), it also detects TV commercial times for showing of personalized and localized ads based on ad schedule generated by Ad Decision Support Unit (2-1) through a pre-configured ad channel or the current program channel, additionally, if a channel and/or a certain period of time does not have personalizable or localizable ads and/or ad schedule not generated, this control unit will show the normal ads directly carried by the TV service providers;

User Information Unit (2-4): stores user attributes information, which is updated through Ad Center (1)'s Repository Unit, it also stores user viewing patterns collected by the Ad Decision Support Unit (2-1) and ad preferences set up by the user;

Ad Follow-Up Unit (2-5): used to follow up ads for additional or more detailed video and/or data info in real-time or at a later time;

Ad Preference Setup Unit (2-6): helps users to setup their ad preferences for a certain period of time, which are used by the Ad Decision Support Unit (2-1) to generate the appropriate personalized and localized ad schedule; Ad preferences can be based on ad classifications implied by ad attributes, shopping plan for a certain period, additionally and if applicable, users can also setup their ad preferences through the account management system provided by the applicable TV Service Providers;

Ad Search Unit (2-7): search and browse ad with ad attributes and keywords;

Input/Output Unit (2-8): used for transmitting input and output information (video, data, etc.) with other interfaces, including Ad Center (1), and/or TV service providers, and/or Displays (3), and/or TV (4), and/or internet;

Remote Control Unit (2-9): used by users to control functions supported by the intelligent control module (2), like Ad follow-up (2-5), ad preference setup (2-6), ad search (2-7).

The said Ad Decision support unit (2-1) is an intelligent module that determines a user personalized and localized ad schedule pertaining to channels and time. The decision support is based on ad attributes, user attributes, user viewing patterns, user ad preference setup, which are collected and further processed by the intelligent programs (AI-based rules engine, mathematical and statistical derivations).

Ad decision support unit (2-1) will base its decisions in accordance with a country or area's laws and regulations, like laws on alcohol, cigarette, and child's content, etc. These laws and regulation must be considered and abided by the said method and system and are an important element of the decision rules. This information, with the following information, at the discretion of a user, can be interchanged with the ad center (1), for generation of the user directed ad schedule on the server side. Attributes used by the ad decision support unit (2-1) include:
 a. Ad attributes: collected during the ad sale and setup process, including
  a) Ad category and targeted group,
  b) Ad display time and channels,
  c) Ad content keywords and/or searchable ad meta data;
 b. User Attributes: age group, sex, address, account and service history, etc.,
 c. Public/purchasable user information: can be gathered with common user attributes, like demographic data, purchasable information from credit bureau, etc, d. User viewing patterns: collected by the decision support unit (2-1) about user's viewing patterns (e.g. frequently watched channels, content, time, etc.), e. User ad preference setup: user liked and disliked ad content and categories.

Ad decision support is based on artificial intelligence (rules engine and business rules), mathematical and statistical models for attributes patterns similar to the ones practiced in data analysis, data mining and business intelligence fields.

Ad decision support unit (2-1) can be triggered with addition, change, or removal of a ad, user information or attribute, like a. New or changed ad transmitted through ad center (1)
b. New or changed ad time
c. New or changed user attributes or information
d. New or changed user viewing patterns
e. New or changed user ad preference setup With consensus from users, these data can be updated to the ad center (1) and used to refine the decision making for generated user personalized and localized ad schedule (e.g. do not put user disliked ad in the ad set).

Output from the ad decision support unit (2-1) is ad schedules personalized and localized to a user pertaining to channels and time.

It is pointed out again here that the said ad decision support unit (2-1) is an intelligent program based on artificial intelligence technology, and mathematical and statistical models. The program collects user's viewing patterns and ad preferences, etc, which, based on user setup, can be uploaded to the ad center (1) for processing by the ad output decision support unit (1-4). The uploaded information enables the ad center (1) with more user attributes and information for better processing of and adjustment of user's information and user applicable ad sets.

Ad Repository Unit (2-2) is used for store ads. This unit can reside in memory, hard disk, and/or other storage media.

1. It stores
   a) Ads for a certain periods of time (for a certain period and/or certain channels or all channels),
   b) Ads that can be personalized or localized or ads that have the follow-up contents, for example, 30 seconds ad with its follow-up content that can last for 3 minutes.
2. Ad stored in the repository can be updated in real-time. Ad can be transmitted from the ad center (1) at a certain frequency or frequencies and/or through internet broadband connection to the intelligent control module (2). When a user requests ad(s) through the intelligent control module (2) to the ad center (1), ad center will search the ads in its ad database and transmit the ads to the ad repository.
3. Ad stored in the repository will be removed based on the ad expiration property.

User information unit (2-4) stores user attributes and user information transmitted from the ad center (1) and collected by the ad decision support unit (2-1) like user viewing patterns, ad preference setup, etc. These can be, optionally, entered by user themselves, which, in certain scenarios, would benefit the users for ads to be more personalized and localized, since a change of job, interest would take a while for these to be reflected through public or purchasable information. If users can enter them, it will have the ad more personalized and localized.

With ad preference setup unit (2-6), users can setup their preferences for ads. For example, people who enjoy food might setup preference for certain types of cuisine, people on the look for cars might like to watch ad for cars, people who has shopping plans for certain goods might be interested in get ads for these goods. These preferences can be setup with the unit to be used by the ad decision support unit (2-1) for generation of ad schedule tailored to user preferences.

Ad follow-up unit (2-5) can be performed through pressing the ad follow-up key on the remote or intelligent control module (2). Users can use this unit to follow up interested ad for more detailed information. Ad follow-up can be achieved through 3 paths:

a. First Path: if the ad repository (2-2) contains additional or more detailed video and/or data information for the interested ad(s), ad follow-up and/or search can be performed directly against the Ad Repository (2-2) inside the Intelligent Control Module (2), follow-up details about the advertised product or service will be shown through Display (3) or TV (4) to users;

b. Second Path: ad follow-up or ad search request sent through the Input/Output Unit (2-8) to the Ad Center (1), which will trigger ad follow-up and/or search in the Ad Database (1-3) and transmit the matching results back to the Intelligent Control Module (2) (requester) for viewing, additionally, per agreement with users, and/or ad agencies, and/or advertisers, and/or TV service providers, expired, and/or similar ads, and/or their follow-up details can also be followed up, searched and transmitted back;

c. Third Channel: ad follow-up or ad search request is sent through the internet connection port on the Intelligent Control Module (2) and performed over the internet.

The said second path for ad follow-up and/or ad search consists of the following process: Control Unit (1-6) first searches the ad database (1-3) for the requested information; and/or search the advertiser's web or information center for additional video or data information; and/or provides the ad follow-up or search requester with a number of (pre-set) follow-up ads, and/or similar ads, and/or internet web sites for the requester to click to enter the sites.

Ad search unit (2-7) can be performed through pressing the ad search key on the remote or intelligent control unit (2), which is used to search ad inside the ad repository (2-2) or ad center (1)'s database or internet. Control Unit (2-3) controls and interfaces with all the components of the intelligent control unit for switching between ad display and regular TV program content display, and also controls connections to external sources like ad center (1) and the internet.

Remote Control (2-9): used by users to control functions supported by the intelligent control module (2), like Ad follow-up (2-5), ad preference setup (2-6), ad search (2-7).

Ad Center (1) and Intelligent Control Module (2) communicates in real-time with event-driven mechanism via their respective input/output interfaces (1-5) (2-8) for exchange of ad, user information, and software updates.

The above description details the present invention's system and method, its composition and the major components and functionalities.

The present inventions is characterized by personalization and localization of ad pertaining to users, channels, and time, realized by decision processing based on ad attributes, user attributes (like user credit history, household income, family structure, etc), user viewing pattern, user ad preference setup, and the related local laws and regulations. All the attributes are collected and processed by intelligent control module's ad decision support unit (2-1) and/or Ad center (1)'s ad output decision support unit (1-4) to determine user-directed personalized and localized ad schedules and/or ad sets The method and system in accordance with the present invention allows advertisers and agencies direct and focus their ads to potential users who are most likely interested in their products or services for a certain period. With the aid of data and intelligent programs, the said method and system improve the effectiveness of ad delivery. Additionally, ads delivery can also be localized to a location, like a building structure or district, area code, census district, shops, bars, etc.

What is claimed is:

1. A system for delivering personalized and localized ad content to multiple users each having an A/V display comprising:
a plurality of Intelligent Control Modules (ICM), each ICM being operationally coupled to an A/V display for displaying personalized and localized ad content during programming commercial breaks, wherein each ICM being configured to determine user personalized and localized ad schedules pertaining to channels and time, wherein each of said ICMs including an ad decision support unit configured to collect user viewing patterns based on intelligent programs and event triggering mechanisms, wherein expert business rules and mathematical and statistical models are established to analyze user and ad attributes information, including viewing patterns and user ad preferences; and
an Ad Center having multi-directional communications links with said plurality of Intelligent Control Modules to receive each user's personal and location attributes; said Ad Center including (i) a repository unit for storing user information and ad agency or advertiser information, (ii) an ad output decision making unit configured to perform data processing, analysis, and decision making based on ad attributes and user attributes associated with each ICM, (iii) an ad input/output unit configured to handle communication with at least one of the ICM and external sources, said communication including distribution of ad sets and/or ad schedules to the intelligent control modules upon generation of user directed ad sets and/or user personalized and localized ad schedules by the ad output decision making unit user information from the repository unit to intelligent control modules, receipt of user requests, transmission of upload information on user viewing patterns and/or ad preferences from intelligent control modules; and (iv) an ad control unit configured to control and monitor all components of said ad center and to process and dispatch information for and request and control software updates for the ICM; wherein both of said ICMs and Ad Center being configured to analyze ads, ad agencies, advertisers, and user info and to select personalized and localized ad content for each ICM based on its corresponding personal and location attributes to transmit user's personal and local attributes, ad content, programming content from service providers, user ad search and follow-up requests, and software and firmware updates, wherein said Ad Center is independent from the service providers and includes one interface for each service provider;
wherein users can follow-up and search for additional ad information through one or more telecommunication sources connected to their ICM.

2. The system of claim 1, wherein the Ad center further comprises:
a receiving unit configured to receive at least one of TV channels, programs, and ad content from at least one of satellite TV providers, cable TV providers, TV stations, terrestrial TV providers, Internet TV providers, and IPTV;
an ad database configured to store at least one of ads, expired ad information, and ad follow-up information.

3. The system of claim 2, wherein the user information includes at least one of access card information, localization information, user attributes, and user viewing patterns and ad preferences collected by the Intelligent Control Modules:
with user attributes as combinations of personal and location attributes, including user's age group, profession, location properties, account and service information, program preference, and/or TV viewing patterns and ad preferences, and/or public or purchasable user information like demographic data, user credit history, household information, and/or merchant types, category, and attributes;
with location attributes further including one of user's location, houses, shops, restaurants, bars, plants, and factories and can further be categorized based on one of zip code, zip plus 4, telephone area code, census tract data, building district information, and road sector, 4. The system of claim 1, wherein service providers comprise at least one of a terrestrial TV service provider, a cable TV provider, a satellite TV provider, an Internet TV service provider, an Internet Protocol (IP) TV service provider, an independent content service provider, a provider affiliated with said aforementioned service providers, and an independent personalized and localized ad service provider.

5. The system of claim 1, wherein the ICM comprises an independent module integrated with at least one of a TV, a TV set top box, the A/V display, and a computer.

6. The system of claim 1, wherein the ICM comprises an autonomous device residing separate from at least one of a TV, a TV set top box, the A/V display and a computer.

7. The system of claim 1, wherein the ICM further comprises:
an ad repository unit configured to store personalizable and localizable ads and non-personalizable and non-localizable ads, which are updated in real-time by the ad center and removed in real-time based on their expiration attributes;
an ICM control unit configured to control and monitor all components in the ICM and to detect TV commercial times for showing of personalized and localized ads based on ad schedule generated by the ad decision support unit through a pre-configured ad channel or the current program channel;
a user information unit configured to store user attribute information, which is updated through the repository unit, and to store user viewing patterns collected by the ad decision support unit and ad preferences set up by the user;
an ad follow-up unit configured to follow up ads for additional or more detailed video and/or data information in real-time or at a later time;
an ad preference setup unit configured to help users setup their ad preferences for a certain period of time, which are used by the ad decision support unit to generate the appropriate personalized and localized ad schedule, wherein ad preferences are based on ad classifications implied by ad attributes, shopping plans for a certain period;
an ad search unit configured to search and browse ads with ad attributes and keywords;
an input/output unit configured to transmit input and output information with interfaces including at least one of the ad center, TV service providers, A/V displays, TV and internet; and a remote control unit configured to be used by users to control functions supported by the intelligent control module.

8. A method for delivering personalized and localized ad content to multiple users each having an A/V display, comprising the steps of:
   providing a plurality of Intelligent Control Modules (ICMs), each ICM displaying personalized and localized ad content during programming commercial breaks on an A/V display, wherein each ICM being configured to determine user personalized and localized ad schedules pertaining to channels and time, wherein each of said ICMs including an ad decision support unit configured to collect user viewing patterns based on intelligent programs and event triggering mechanisms, wherein export business rules and mathematical and statistical models are established to analyze user and ad attributes information, including viewing patterns and user ad preferences;
   establishing a multi-directional communications link between said plurality of ICM's and an Ad Center for transmission of user's personal and location attributes, ad content, and/or programming content from service providers, user ad search and follow-up requests, software and firmware updates to each ICM with said Ad Center; said Ad Center including (i) a repository unit for storing user information and ad agency or advertiser information, and (ii) an ad output decision making unit configured to perform data processing, analysis, and decision making based on ad attributes and user attributes associated with each ICM, (iii) an ad input/output unit configured to handle communication with at least one of the ICM and external sources, said communication including distribution of ad sets and/or ad schedules to the intelligent control modules upon generation of user directed ad sets and/or user personalized and localized ad schedules by the ad output decision making unit, user information from the repository unit to intelligent control modules, receipt of user requests, transmission of upload information on user viewing patterns and/or ad preferences from intelligent control modules; and (iv) an ad control unit configured to control and monitor all components of said ad center and to process and dispatch information for, and request and control software updates for the ICM, wherein said Ad Center is independent from the service providers and includes one interface for each service provider;
   configuring both of said ICMs and Ad Center for analyzing ads, ad agency, advertiser, and user info and selecting personalized and localized ad content for each ICM based on its corresponding personal and location attributes, ad content, programming content from service providers, user a search and follow-up requests and software and firmware updates; and
   connecting one or more telecommunication sources to each ICM, so that users can follow-up and search for additional ad info.

9. The method according to claim 8, wherein the step of selecting personalized and localized ad content further comprises performing the ad follow-up request and/or ad search via a first path, said first path comprising the steps of:
   determining if an ad repository in the ICMs includes additional video and/or data information for a user-interested ad;
   performing at least one of an ad follow-up and search directly against the Ad Repository within the Intelligent Control Modules; and
   displaying follow-up details to the users about the user-interested ad via the A/V Display.

10. The method of claim 8, wherein the step of selecting personalized and localized ad content further comprises performing the ad follow-up request and/or ad search via a second path, said second path comprising the steps of
   sending at least one of the ad follow-up and ad search requests through an ICM Input/Output Unit in at least one of the ICMs to the Ad Center;
   conducting at least one of an ad follow-up and ad search in an Ad Database in the Ad Center; and
   transmitting matching results back to the applicable intelligent Control Module for viewing.

11. A method in accordance with claim 10, wherein the second path further comprises the steps of
   searching the matching results fur additional and online video and data information; and
   providing at least one of a follow-up ad and an internet website to the requesting user.

12. The method of claim 8, wherein the step of selecting personalized and localized ad content further comprises performing the ad follow-up request and/or ad search via a third path, said third path comprising the step of:
   sending at least one of the ad follow-up and ad search requests via an internet connection port on the Intelligent Control Modules.

13. The method of claim 8, further comprising the steps of:
   providing an Ad Decision Support Unit in at least one ICM for generating a user personalized and localized ad schedule; and
   providing an ICM control unit for playing recommended ads to the user based on the ad schedule, wherein triggering of intelligent programs within the Ad Decision Support Unit is event-based.

14. The method of claim 13, further comprising the steps of:
   performing personalization and localization processing by the Ad Decision Support Unit based on ad and user attributes;
   determining an applicable ad set for transmission to the user's Intelligent Control Modules; and
   determining ad schedules pertaining to a user if the user's viewing patterns and ad preferences are available, wherein the ad and user attributes are collected and processed by at least one of the Ad Decision Support Units and an Ad Center Output Decision Support Unit for determining at least one of the user personalized and localized ad schedules and at least one applicable ad set.

15. The method of claim 8, further comprising the steps of:
   the Ad Center and the Intelligent Control Modules communicating and exchanging information in real-time with an event-driven mechanism via the Ad Center Input/Output Unit and the ICM Input/Output Unit;
   determining at least one of user applicable and personalized and localized ad sets and ad schedules; and
   updating the Ad Center based on at least one of an addition, change or removal of an ad, user information or user attribute.

16. A system for delivering personalized and localized ad content to multiple users each having on A/V display comprising;
   a plurality of Intelligent Control Modules (ICM), each ICM being operational coupled to an A/V display for displaying personalized and localized ad content during programming commercial breaks, wherein each ICM being configured to determine user personalized and localized ad schedules pertaining to channels and time; and an Ad Center having multi-directional communications links with said plurality of Intelligent Control Modules to receive each user's personal and location attributes; said Ad Center including a repository unit for storing user information and ad agency or advertiser information; at least one of said ICMs and Ad Centers being configured to analyze ads, ad agencies, advertisers, and user info and to select personalized and localized ad content for each ICM based on its corresponding personal and location attributes to transmit user's personal and local attributes, ad content, programming content from service providers, user ad search and follow-up requests, and software and firmware updates, wherein said Ad Center is independent from the service providers and includes one interface for each service provider, wherein the Ad center further includes a receiving unit configured to receive at least one of TV channels, programs, and ad content from at least one of satellite TV providers, cable TV providers, TV stations, terrestrial TV providers, Internet TV providers, and IPTV; a repository unit configured to store advertiser information, ad agency information, ad information, and user information; an ad database configured to store at least one of ads, expired ad information, and ad follow-up information; an ad output decision making unit configured to perform data processing and decision making based on ad attributes and user attributes associated with each ICM; an ad input/output unit configured to handle communication with at least one of the ICM and external sources, said communication including distribution of ad sets and/or ad schedules to the intelligent control modules upon generation of user directed ad sets and/or user personalized and localized ad schedules by the ad output decision making unit, user information from the repository unit to intelligent control modules, receipt of user requests, transmission of upload information on user viewing patterns and/or ad preferences from intelligent control modules; and an ad control unit configured to control and monitor all components of said ad center and to process and dispatch information for, and request and control software updates for the ICM;

wherein users can follow-up and search for additional ad information through one or more telecommunication sources connected to their ICM.

17. The system of claim 16, wherein the user information includes at least one of access card information, localization information, user attributes, and user viewing patterns and ad preferences collected by the Intelligent Control Modules;

with user attributes as combinations of personal and location attributes, including user's age group, profession, location properties, account and service information, program preference, and/or TV viewing patterns and ad preferences, and/or public or purchasable user information like demographic data, user credit history, household information, and/or merchant types, category, and attributes;

with location attributes further including one of user's location, houses, shops, Restaurants, bars, plants, and factories and can further be categorized based on one of zip code, zip plus 4, telephone area code, census tract data, building district information, and road sector.

18. The system of claim 16, wherein service providers comprise at least one of a terrestrial TV service provider, a cable TV provider, a satellite TV provider, an Internet TV service provider, an Internet Protocol (IP) TV service provider, an independent content service provider, a provider affiliated with said aforementioned service providers, and an independent personalized and localized ad service provider.

19. The system of claim 16, wherein the ICM comprises one of (i) an independent module integrated with at least one of a TV, a TV set top box, the A/V display, and a computer and (ii) an autonomous device residing separate from at least one of a TV, a TV set top box, the A/V display and a computer.

20. The system of claim 16, wherein the ICM further comprises:

an ad decision support unit configured to collect user viewing patterns based on intelligent programs and event triggering mechanisms, wherein expert business rules and mathematical and statistical models are established on user and ad attributes information, including viewing patterns and user ad preferences;

an ad repository unit configured to store personalizable and localizable ads and non-personalizable and non-localizable ads, which are updated in real-time by the ad center and removed in real-time based on their expiration attributes;

an ICM control unit configured to control and monitor all components in the ICM and to detect TV commercial times for showing of personalized and localized ads based on ad schedule generated by the ad decision support unit through a pre-configured ad channel or the current program channel;

a user information unit configured to store user attribute information, which is updated through the repository unit, and to store user viewing patterns collected by the ad decision support unit and ad preferences set up by the user;

an ad follow-up unit configured to follow up ads for additional or more detailed video and/or data information in real-time or at a later time;

an ad preference setup unit configured to help users setup their ad preferences for a certain period of time, which are used by the ad decision support unit to generate the appropriate personalized and localized ad schedule, wherein ad preferences are based on ad classifications implied by ad attributes, shopping plans for a certain period;

an ad search unit configured to search and browse ads with ad attributes and keywords;

an input/output unit configured to transmit input and output information with interfaces including at least one of the ad center, TV service providers, A/V displays, TV and internet; and a remote control unit configured to be used by users to control functions supported by the intelligent control module.

* * * * *

UNITED STATES PATENT AND TRADEMARK OFFICE
CERTIFICATE OF CORRECTION

| | | |
|---|---|---|
| PATENT NO. | : 8,321,889 B2 | Page 1 of 1 |
| APPLICATION NO. | : 10/585225 | |
| DATED | : November 27, 2012 | |
| INVENTOR(S) | : Kamfu Wong and Ninghua Pu | |

It is certified that error appears in the above-identified patent and that said Letters Patent is hereby corrected as shown below:

Column 9, line 40 (Claim 1, line 31) following "unit" insert a --,--;

Column 9, line 46 (Claim 1, line 37) following "for" insert a --,--;

Column 11, line 16 (Claim 8, line 13) delete "export" and insert --expert--;

Column 11, line 53 (Claim 8, line 50) following "user" delete "a" and insert --ad--;

Column 12, line 6 (Claim 10, line 4) following "of" insert a --:--;

Column 12, lines 13-14 (Claim 10, lines 10-11) delete "intelligent" and insert -- Intelligent--;

Column 12, line 17 (Claim 11, line 3) delete "fur" and insert --for--;

Column 12, line 65 (Claim 16, line 5) delete "operational" and insert --operationally--; and Column 14, line 2 (Claim 17, line 14) delete "Restaurants" and insert --restaurants--.

Signed and Sealed this
Second Day of April, 2013

Teresa Stanek Rea
*Acting Director of the United States Patent and Trademark Office*